United States Patent [19]
Norberg

[11] Patent Number: 5,466,113
[45] Date of Patent: Nov. 14, 1995

[54] ARRANGEMENT FOR THE RETENTION OF AN IMPLEMENT TO A LIFTING GEAR

[75] Inventor: Lars G. Norberg, Zweibrücken, Germany

[73] Assignee: Deere & Company, Moline, Ill.

[21] Appl. No.: 265,179

[22] Filed: Jun. 24, 1994

[30] Foreign Application Priority Data

Aug. 19, 1993 [DE] Germany .......................... 43 27 942.2

[51] Int. Cl.[6] ........................................ E02F 3/80
[52] U.S. Cl. ............................................ 414/723; 37/468
[58] Field of Search ................................ 414/723, 686; 37/468; 403/324, 325; 172/272–275

[56] References Cited

U.S. PATENT DOCUMENTS 3,985,249 10/1976 Aker et al. .
4,436,477 3/1984 Lenertz .
5,078,569 1/1992 Cook ........................................ 414/723

FOREIGN PATENT DOCUMENTS

3924313A1 2/1990 Germany .
2182834 7/1990 United Kingdom .

*Primary Examiner*—Donald W. Underwood

[57] ABSTRACT

An arrangement for latching an implement to an implement carrier includes a lock formed from a J-shaped rod so as to have spaced, axially aligned pin-shaped latch components respectively located at the ends of short and long legs of the rod. The lock is reciprocally mounted to one of right and left carrier holders with the latch components being releasably received in transversely spaced sets of mounting openings provided in the carrier and in the implement. The lock includes a handgrip extending between the short and long legs of the lock and being located outwardly of the holder to which the lock is mounted so as to be easily accessible to an operator who can grasp the same and effect simultaneous movement of the latch components to detach the implement from the carrier.

6 Claims, 2 Drawing Sheets

ARRANGEMENT FOR THE RETENTION OF AN IMPLEMENT TO A LIFTING GEAR

BACKGROUND OF THE INVENTION

The present invention concerns an arrangement for the retention of an implement to a lifting gear, in particular to a front loader, where the implement and the lifting gear are provided with openings that can be brought into alignment with each other which accept locking components that can be inserted into the openings at retention points spaced at a distance from each other.

A lifting gear, such as a boom of a front loader, is provided at one end with various operating implements or tools for universal applications. For example, an earth scoop, a manure fork, a bale fork or a pallet fork could be used. In order to keep the time for the assembly and disassembly of these implements as short as possible, pin connections are provided.

This type of connection is disclosed in U.S. Pat. No. 3,985,249 which reveals a connection arrangement with a pin on each side of the lifting gear or its implement support which are inserted into openings in the lifting arms and the implement that are aligned with each other and thereby locks these to each other. Each of the pins is preloaded into its locking position by means of a spring and is in contact with a lever arm at a stop in the unlocked position. After the implement has been engaged by hooks it is tilted in such a way that the lever arm is pushed away from the stop and is forced into the opening under the force of the spring.

This arrangement has the disadvantage that an operator must remove a pin on each side in order to disassemble the implement.

On the other hand, U.S. Pat. No. 4,436,477 reveals a locking arrangement of a front loader implement on a boom, in which hooks provided on each side encircle a fixed pin and are actuated by a common shaft. However, here a different method is used to lock the implement.

Finally it is known practice in utility vehicles (DE-OS-39 24 313 and Great Britain Patent No. 21 82 834) to use a pivot lever with two lever arms each of which is connected at a joint to a pin, so that both pins can be brought into the locked or the unlocked position by a single pivoting motion of the pivot lever. The pivot lever is retained at a detent under spring force and is automatically disengaged as a result of the tilting of the implement, so that it reaches the locked position.

This arrangement has the disadvantage that the pivot lever in each case extends between the two arms of the lifting crank and hence is poorly accessible.

SUMMARY OF THE INVENTION

According to the present invention, there is provided an improved arrangement for attaching implements to a lifting gear, such as the boom of a front loader.

An object of the invention is to provide an arrangement for the retaining of an implement to a lifting gear, in particular to a front loader, which can be operated in a single process from one side of the lifting gear.

A more specific object of the invention is to provide an arrangement, as defined in the preceding object, including a J-shaped lock carried by one of a pair of laterally spaced implement holders of a carrier adapted for connection to a loader boom, the lock having a handle located outboard of said one holder and joining short and long legs which are received in apertures provided in said one holder, said long leg including an offset end section aligned with said short leg and said short and long legs being simultaneously shiftable between latched and unlatched positions respectively into and from apertures provided in a pair of carrier mounting brackets and into and from aligned apertures of a pair of implement mounting brackets.

Yet another specific object of the invention is to provide and arrangement, as defined in the immediately preceding object, wherein at least one biasing spring is provided for yieldably resisting movement of the lock from its latched position.

Still another specific object of the invention is to provide and arrangement, as defined in the immediately preceding object, wherein said lock is pivotable about an axis extending centrally through said short leg and offset section of the long leg of said lock, and that aperture, in said one holder, which contains the long leg of the lock, being in the form of a slot formed arcuately about said axis and having a wide width section containing a stop, in the form of a sleeve carried by the long leg, when the lock is in its latched position, and having a narrow width section for containing the lock and preventing inward movement of the lock after the latter has been shifted outwardly to its unlatched position and rotated about said axis.

These and other objects will become apparent from a reading of the ensuing description together with the appended drawings.

DESCRIPTION OF THE PREFERRED EMBODIMENT

Figure 1:
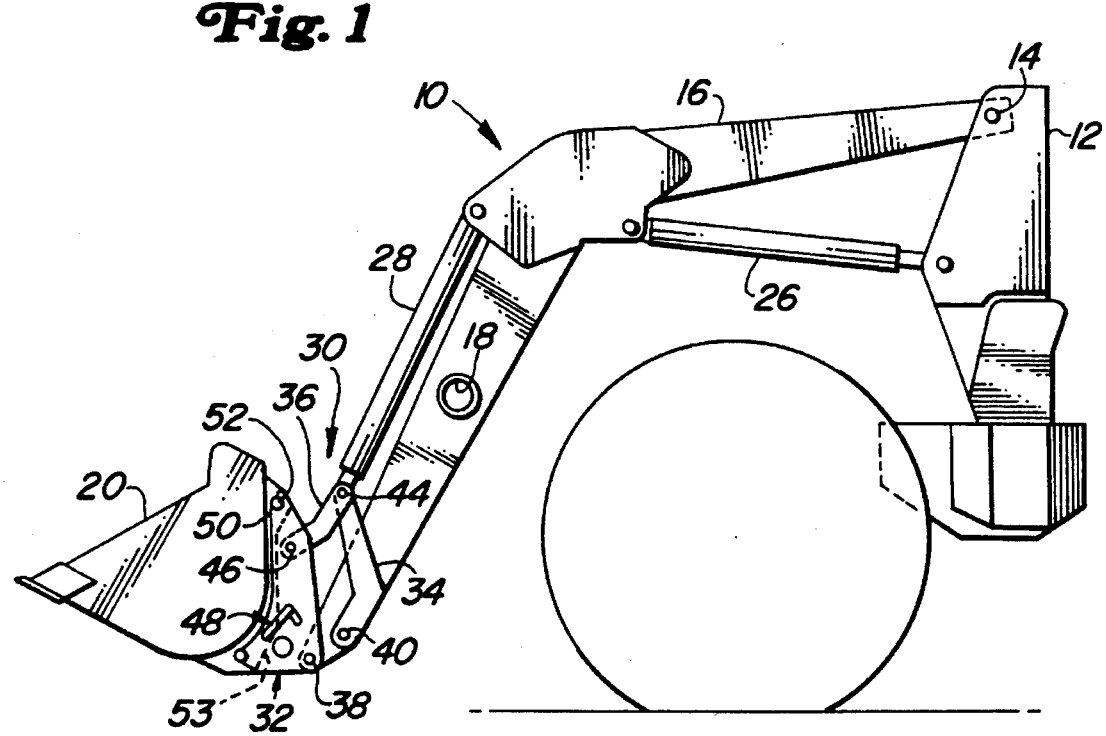
FIG. 1 is a side view of a lifting gear with an implement.

FIG. 1 shows a lifting gear 10 that is connected to the front end of an agricultural tractor which is only indicated and which contains a mast 12 and uses a bearing 14 to support a boom 16, which is reinforced by a transverse support 18 in view of its double arm configuration. An implement 20, for example, an earth scoop, a manure fork, a bale fork or a pallet fork, is connected to the front end of the boom 16 so as to be movable and interchangeable by means of an actuating arrangement 30 and an implement support 32 to be described in greater detail in the following. In order to lift the implement 20 the boom 16 is rotated about the bearing 14 by hydraulic cylinders 26; a further hydraulic cylinder 28 engages with one end the actuating arrangement 30 and with its other end the boom 16 so as to adjust the inclination of the implement 20. The actuating arrangement 30 operates on the implement support 32 to which the implement 20 is directly attached, and consists generally of a first and a second pivot arm 34, 36 that are connected to each other in a joint, at which the hydraulic cylinder 28 engages the pivot point 44. The implement support 32 is supported in a bearing 38 and the first pivot arm 34 is pivotally supported in a bearing 40 on the boom 16. The second pivot arm 36 is pivotally connected in a bearing 46 with the implement support 32 and a lock is designated as 48, which will be described in greater detail below, is carried by the implement support 32. Provided in the upper region of each of opposite ends of the implement support 32 is a hook 50 in which is received a pin 52 (FIGS. 1 and 2) that is mounted to a respective one of a pair of brackets each composed of double walls 53 located on the backside of the implement 20 such that the latter is brought into engagement with the lifting gear 10. A transverse pin 55 is mounted to a lower region of each of the pair of double walls 53 and extending radially from an inner end thereof is a bracket 57, having a purpose explained below.

Figure 2:
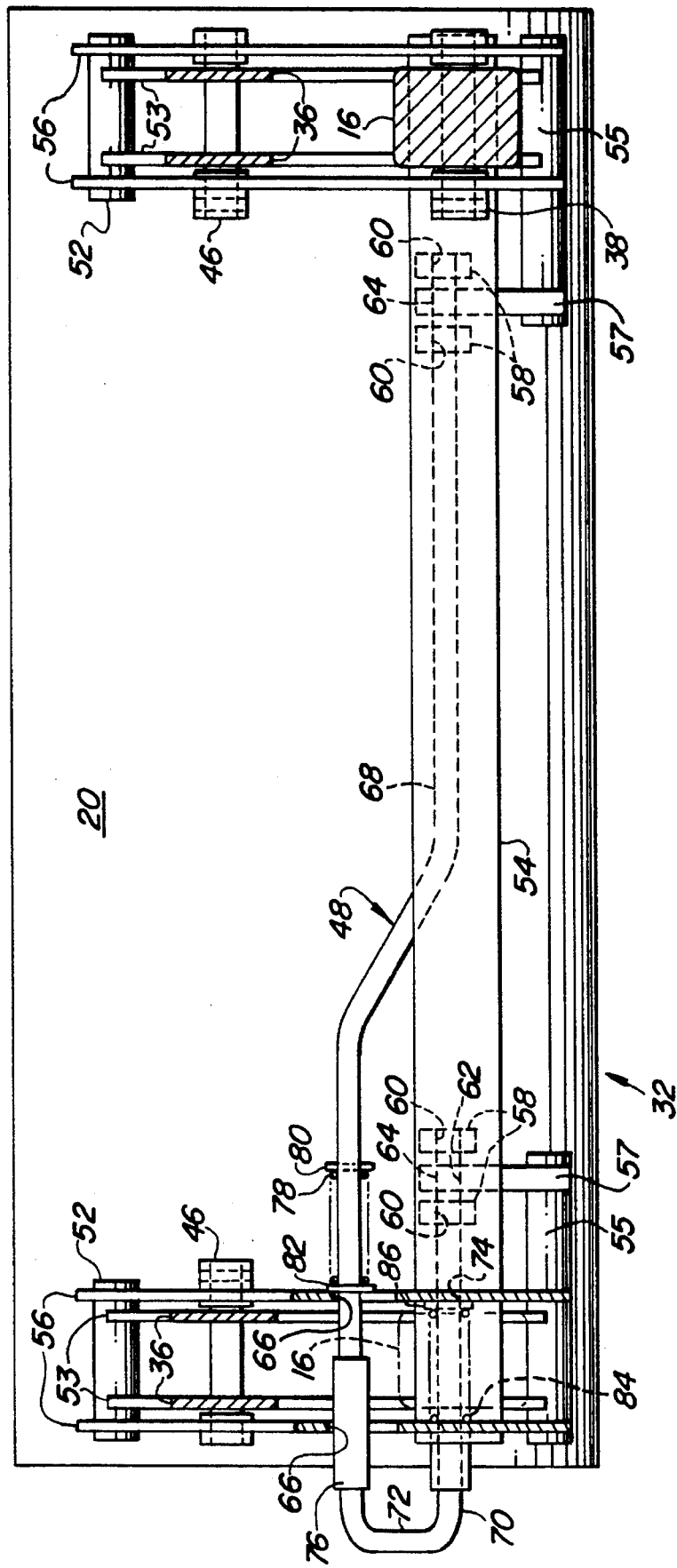
FIG. 2 is a rear elevational view of an arrangement retaining the implement to the lifting gear, with the left arm of the lifting gear boom being shown in phantom and with other parts being shown in section for clarity.

According to FIG. 2, the implement support 32 is composed on its underside of a transverse rod 54, in the form of a cylindrical tube, extending over the entire width, and two sets of double walls 56 which are penetrated by the end regions of the transverse rod 54 and welded to it.

Two pairs of parallel brackets 58 are joined to, and project radially toward the implement from the front side of the rod 54 at respective locations spaced inwardly from the opposite ends of the rod 54. Each pair of brackets 58 is provided with openings 60 that are aligned with each other. One of the brackets 57 is located between each of the pair of brackets 58 and, each bracket 57 has an opening 62 aligned with the openings 60 in the pair of brackets 55. The openings 60 and 62 engage pin-shaped locking components 64 attached to the lock 48, by means of which the implement 20 is secured to the implement support 32 and through which the locking components 64 of the lock 48 can be inserted.

The double walls 56 on each side support the hook 50 in their upper corner region, the bearing 46 below it and offset to the rear, and the bearing 38 in the right lower corner region, for connection to the boom 16. Beyond that the walls 56 located on the left in FIG. 2 are each provided with two longitudinal slots 66 aligned with each other, whose centerline is located on a circular arc centered about the opening 60. The longitudinal slot 66 of the wall 56 located on the outside left in FIG. 2 is provided with a narrow slot width in a lower section and with a wider slot width in an upper section.

The lock 48 is manufactured from a round steel bar in the shape of a letter "J" with a first, long leg 68, a second, short leg 70 and a handgrip 72 that is formed by a cross member connecting these two legs.

Between the handgrip 72 and the end used as the right locking component 64, the first, long leg 68 is bent twice in opposite directions through approximately 30° and is guided constantly by means of the locking component 64 in the opening 60 in the inner bracket 58 on the right side. The section of the long leg 68 opposite the locking component 64 and offset radially from it extends through both longitudinal slots 66 and carries a stop 76 configured as a sleeve which extends halfway each to the left and right of the outside wall 56 in the locking position of the lock 48 shown in FIG. 2. This length of the section of the stop 76 extending in the space between both walls 56 corresponds generally to the path of actuation of the lock 48 for the locking and unlocking of the implement 20. The outside diameter of the stop 76 is smaller than the wider slot width, but is larger than the narrower slot width of the outer longitudinal slot 66. Inside, that is to the right as seen in FIG. 2 of the inner, left wall 56, the long leg 68 is enclosed by a concentric spring 78, one end of which is in contact under preload with a pin 80 penetrating the long leg 68 radially while the other end is similarly in contact with a washer 82 that is in sliding contact with the wall 56, where the diameter of the washer 82 is greater than the width of the slot 66 in its widest section.

The handgrip 72 is bent at each of two places through 90° in the same direction and extends from the outside wall 56 to the outside into a region easily accessible to an operator. The second, short leg 70 is directed parallel to the long leg 68 in the section up to its bend and extends through the openings 60 in the left side and through corresponding aligned bores 74 in the left walls 56, if necessary enclosed by guides. In the region between the walls 56 of the left side the second, short leg 70 is also enclosed concentrically by a spring 84 which is supported at one end on the inner side of the outer left wall 56 and at the other end by a pin 86 penetrating the short leg 70. Following the spring 84, an end section is also used as the locking component 64 which is guided at all times in the opening 60 of the left bracket 58.

FIG. 2 clearly shows that the lock 48 can be grasped by the handgrip 72 and pulled to the left against the force of the two springs 78, 84, so that both locking components 64 are extracted from the right-hand one of each of the pair of brackets 58 and clear the space between the each of the pair of brackets 58 in order to engage or disengage the brackets 57 on the back side of the implement 20. Accordingly, it is necessary for the unlocking or freeing of the implement 20 to pull the lock 48 outward, that is to the left in FIG. 2. As disclosed, movement of the lock 48 to its unlatched position is performed manually, with return to its latched position occurring automatically as will presently be described. Without departing from the principles of the present invention, a hydraulic cylinder, electric motor, linkage or rope pull could be connected to the lock 48 to effect movement of the latter to its unlatched position.

Figure 3:
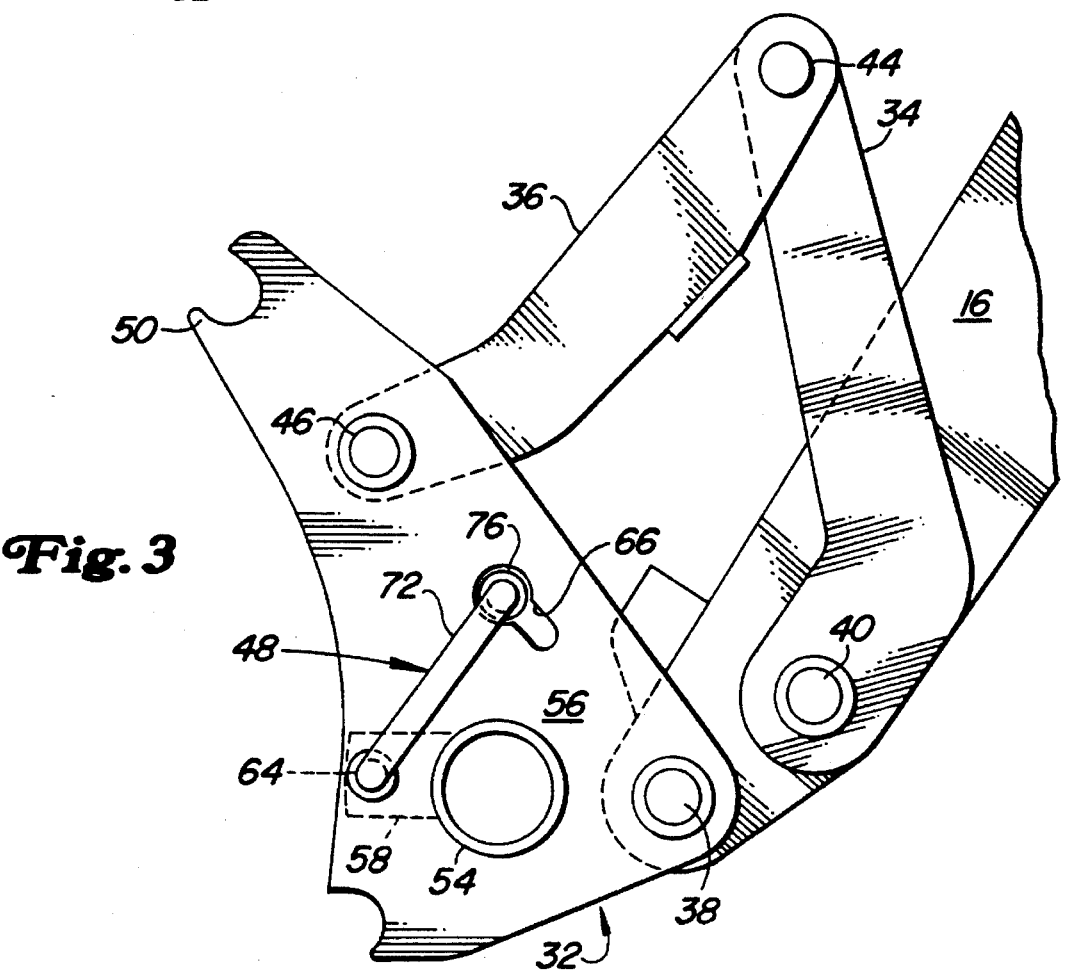
FIG. 3 is a left side elevational view of the forward portion of the lifting gear.

If, on the other hand, the implement support 32 is to be prepared to accept an implement 20, the lock 48 is pulled outward into the unlocking position as previously described and pivoted in the clockwise direction about the axis passing through the openings 60, as seen in FIG. 3, so that the stop 76 rests upon the outer side of the left outer wall 56 in the region of the narrow slot width of the longitudinal slot 66. Thereby the springs 78, 84 are preloaded and the lock 48 is retained in the disengaged position. Subsequently the implement 20 can be engaged and lifted by means of the pin or pins 52 and the hook or hooks 50 so that the brackets 57 on the side of the implement reaches the transverse rod 54 between the brackets 58 and all openings 60 and 62 are aligned. Finally, the implement 20 is tilted towards the boom 16 by means of the hydraulic cylinder 28 so that the stop 76 is brought into contact with the boom 16 and is pivoted in the region of the large slot width. Once this position has been reached the lock 48 is pushed to the right, as seen in FIG. 2, together with the two locking components 64, by the force of the springs 78, 84, so that both locking components 64 penetrate all brackets 57 and 58 and secure the implement 20.

Obviously, the lock 48 is not limited to the use of two locking components 64, but three or even more locking components 64 could be actuated in common.

The general term "lifting gear 10" covers every type of arrangement with which an implement can be grasped and moved into various positions. This includes for example, front loaders, front hitches, three-point implement hitches installed at the rear, slope conveyors on harvesting machines, in which the implement is formed by the cutter head or another front retention, and the like. Specifically concerning front loaders, the lifting gear can be formed by the boom 16 alone, to which the implement 20 is directly attached, without the implement support 32. However, the configurations have no significance to the essence of the invention, since this is concerned with the retention of an implement and its securing to a lifting gear 10 of any configuration.

I claim:

1. In an arrangement for detachably securing an implement to an implement carrier of a type having right and left implement holders, comprising: an elongate lock reciprocally mounted to one of said right and left implement holders for movement as a unit in opposite directions along a horizontal, transverse axis between a latched position and an unlatched position; said lock having first and second, pin-shaped locking components spaced from each other along the length of said lock and located along said axis; said carrier including a pair of attaching points comprising first and second pairs of carrier openings aligned with and spaced transversely from each other and adapted for being placed next to and aligned with first and second implement openings; said first and second pairs of carrier openings being located along said axis and respectively receiving said first and second locking components when the lock is in its latched position; said lock including a handgrip located on an opposite side of said one of said right and left holders from said first and second pairs of carrier openings whereby the handgrip may be pulled away from said one of said right and left holders to move said lock to its unlatched position to simultaneously remove said first and second locking components from at least one of each of said first and second pairs of carrier openings.

2. The arrangement defined in claim 1 and further including at least one spring mounted between said carrier and lock being preloaded to yieldably bias the lock toward its latched position.

3. The arrangement defined in claim 1 wherein said handgrip projects radially relative to said axis.

4. The arrangement defined in claim 1 wherein said lock is J-shaped, thus having a short leg and a long leg; said short and long legs having respective end sections defining said first and second locking components; said one of said right and left holders being provided with first and second holder openings respectively receiving said short and long legs; and said handgrip extending between and joining said short and long legs.

5. The arrangement defined in claim 4 wherein said long leg has an increased cross section portion defining a stop extending inwardly from said handgrip; said second holder opening being shaped arcuately on a radius about said axis and having a wide section dimensioned to accommodate said increased cross section portion of said long leg and a narrow section preventing passage of said increased cross section portion of said long leg; said wide section of the second holder opening receiving said increased cross section of said long leg when the lock is in its latched position; a biasing element coupled between the carrier and the lock and urging the latter towards its latched position; and said increased cross section portion of said long leg being located entirely outwardly of said second holder opening when the lock is pulled outwardly to its unlatched position, the lock then being rotatable about said axis to bring the increased cross section portion into alignment with the narrow section of the second holder opening whereby the increased cross section portion of the long leg acts as a stop preventing the lock from moving inwardly toward its latched position.

6. The arrangement as defined in claim 5 wherein said second holder opening and increased diameter portion of the long leg of the lock are so located that when the increased diameter portion is acting as a stop it is positioned for being engaged, during roll back of the implement during mounting of the latter to the carrier, by a loader boom, adapted for connection to the carrier, so as to move the increased diameter portion of the lock back into register with the wide section of the second holder opening, whereby said biasing element acts to automatically move the lock to its latched position.

* * * * *